United States Patent [19] [11] 3,919,330
Kwantes et al. [45] Nov. 11, 1975

[54] PROCESS FOR THE PURIFICATION OF 2,2-BIS-(4-HYDROXYPHENYL)PROPANE

[75] Inventors: Arien Kwantes; Bernhard Stouthamer, both of Amsterdam, Netherlands

[73] Assignee: Shell Oil Company, Houston, Tex.

[22] Filed: Oct. 3, 1974

[21] Appl. No.: 511,980

[30] Foreign Application Priority Data
Nov. 2, 1973  United Kingdom............... 51006/73

[52] U.S. Cl.......................... 260/619 R; 260/619 A
[51] Int. Cl.² ................ C07C 37/22; C07C 37/26
[58] Field of Search...................... 260/619 A, 619 R

[56] References Cited
UNITED STATES PATENTS

| 3,073,868 | 1/1963 | Prahl et al. | 260/619 A |
| 3,162,690 | 12/1964 | Marx et al. | 260/619 A |
| 3,221,061 | 11/1965 | Grover et al. | 260/619 A |
| 3,326,986 | 6/1967 | Dugan | 260/619 A |
| 3,493,622 | 2/1970 | Ornstein et al. | 260/619 A |

*Primary Examiner*—Norman Morgenstern

[57] ABSTRACT

Crude 2,2-bis(4-hydroxyphenyl)propane containing impurities such as 2-(2-hydroxyphenyl)-2-(4-hydroxyphenyl)propane is purified by first dissolving the crude material in ethylene glycol and then adding a certain amount of water whereby the 2,2-bis(4-hydroxyphenyl)propane is precipated and is then recovered by filtration or centrifigation.

9 Claims, No Drawings

PROCESS FOR THE PURIFICATION OF 2,2-BIS-(4-HYDROXYPHENYL)PROPANE

BACKGROUND OF THE INVENTION

The compound 2,2-bis(4-hydroxyphenyl)propane, also called para, para-diphenylolpropane or Bisphenol A, is generally prepared by reacting phenol and acetone in the presence of an acidic catalyst such as hydrochloric acid along with a sulfur compound such as methyl mercaptan which acts as a co-catalyst. This method of preparing 2,2-bis(4-hydroxyphenyl) propane is disclosed in U.S. Pat. No. 2,730,552. However, the reaction between phenol and acetone to form 2,2-bis(4-hydroxyphenyl)propane also forms a number of byproducts including 2-(2-hydroxyphenyl)-2-(4-hydroxyphenyl)propane also called ortho, para-diphenylolpropane, which is an isomer of 2,2-bis(4-hydroxyphenyl)propane. Further impurities include 2,-2-bis(2-hydroxyphenyl)propane, higher condensation products such as trisphenols (condensation products of three moles of phenol and two moles of acetone) and chroman derivatives (internal condensation products of two moles of phenol and two moles of acetone), plus still higher condensation products in the form of resins and tars. As stated herein, "diphenylolpropane-type compounds" refer to 2,2-bis(4-hydroxyphenyl)propane and the by-product derivatives indicated above.

In certain commercial applications of 2,2-bis(4-hydroxyphenol)-propane, such as the production of polycarbonates, the 2,2-bis(4-hydroxyphenol)-propane must be of high purity, generally containing less than 0.3% weight impurities. Therefore, a number of methods to isolate 2,2-bis(4-hydroxyphenyl)propane in a substantially pure state have already been proposed.

One purification method taught in the British Pat. No. 1,274,798 involves the precipitation of the phenol adduct of 2,2-bis(4-hydroxyphenyl)-propane present in the reaction mixture obtained by reacting phenol with acetone, which mixture contains a large excess of phenol, by lowering the temperature of the reaction mixture after flashing off hydrochloric acid, water, acetone, and a substantial part of the excess phenol from the reaction mixture. After filtration to separate the phenol adduct crystals, the adduct crystals are heated under reduced pressure to a final temperature of about 200°C in order to remove the phenol from the purified 2,2-bis(4-hydroxyphenyl) propane. If desired, the adduct crystals are first combined with heated phenol and water in amounts sufficient to produce a single-phase liquid mixture at approximately 60°C. This liquid mixture is then cooled with gentle stirring to ambient temperature. The adduct crystals formed are then separated by centrifugation and subsequently rinsed with aqueous phenol to remove entrained liquor prior to the conversion of the adduct crystals into 2,2-bis(4-hydroxyphenyl)propane. It should be noted, however, that the decomposition of the phenol adduct takes place at a relatively high temperature, at which temperature the 2,2-bis(4-hydroxyphenyl)propane is a liquid. This liquid 2,2-bis(4-hydroxyphenyl)propane must then be cooled to ambient temperature in the absence of air prior to storage. Accordingly, this method is not attractive due to the added cost of heating the phenol adduct crystals and then cooling the crystals of 2,2-bis(4-hydroxyphenyl)-propane.

Another purification method, taught in East German Patent Specification 54,374, involves the crystallization of 2,2-bis(4-hydroxyphenol)-propane from a methanol solution by the addition of water or by the addition of halo-hydrocarbons, preferably dichloroethane, plus water, followed by washing the crystals with similar halohydrocarbons. However, this method is not attractive since it calls for the additional step of washing the crystals with halohydrocarbons.

Other relatively more simple recrystallization and extraction methods such as the method taught in U.S. Pat. No. 3,326,986 are known in the art. However, if these techniques are used to obtain 2,2-bis(4-hydroxyphenyl)propane in high purity, a number of operations, such as washing and flashing off solvent and/or wash liquid must be performed, which is a disadvantage, especially if 2,2-bis(4-hydroxyphenyl)propane is to be purified in large amounts.

It has now been found that 2,2-bis(4-hydroxyphenyl)propane can be obtained in a very pure state without the above described disadvantages.

SUMMARY OF THE INVENTION

The invention relates to a process for the purification of 2,2-bis(4-hydroxyphenyl)propane in which 2,2-bis(4-hydroxyphenyl)propane containing impurities such as 2-(2-hydroxyphenyl)-2-(4-hydroxyphenyl)-propane is dissolved in ethylene glycol, a certain amount of water is added, and the mixture is cooled and gently stirred whereby crystals of 2,2-bis(4-hydroxyphenyl)propane are precipitated and are thereupon removed by filtration or centrifugation methods.

DETAILED DESCRIPTION OF THE INVENTION

It has been found that very pure 2,2-bis(4-hydroxyphenyl)propane, greater than 99% purity, is obtained in high yields by use of the purification method according to the present invention. The present invention involves the following steps. Initially, the crude 2,2-bis(4-hydroxyphenyl)propane, including any impurities, is dissolved in ethylene glycol. Then the ethylene glycol-crude 2,2-bis(4-hydroxyphenyl)propane solution is contacted with water. Next the mixture of ethylene glycol, crude 2,2-bis(4-hydroxyphenyl)propane and water is gradually cooled and agitated whereby crystals of purified 2,2-bis(4-hydroxyphenyl)propane are precipitated. Finally, these crystals of purified 2,2-bis(4-hydroxyphenyl)propane are recovered by filtration, centrifugation or other similar techniques.

The use of ethylene glycol as a solvent is advantageous for a number of reasons. First, ethylene glycol is relatively inexpensive. Second, the main impurity normally present in crude 2,2-bis(4-hydroxyphenyl)propane, namely 2-(2-hydroxyphenyl)-2-(4-hydroxyphenyl)propane, is highly soluble in the ethylene glycol/water system. Third, in a special instance, the use of ethylene glycol is highly advantageous in the purification of crude 2,2-bis(4-hydroxyphenyl)propane which has been prepared starting from 2,2-dimethyl-1,3-dioxolane and phenol. This process to manufacture 2,2-bis(4-hydroxyphenyl)propane from 2,2-dimethyl-1,3-dioxolane and phenol is taught in co-pending U.S. application Ser. No. 432,376 filed Jan. 10, 1974, wherein ethylene glycol is produced as a by-product in the condensation process. Therefore, when 2,2-bis(4-hydroxyphenyl)propane is produced according to the invention disclosed in U.S. patent application Ser. No. 432,376, the solvent to be used in the purification stage and the crude product to be purified are produced in one step, thereby greatly increasing the efficiency and utility of the invention as is shown below.

The crude 2,2-bis(4-hydroxyphenyl)propane to be purified should contain as a minimum 80% and preferably at least 90% by weight 2,2-bis(4-hydroxyphenyl)propane calculated on the total amount of diphenylolpropane type compounds present, however, the purification of lower quality crude 2,2-bis(4-hydroxyphenyl)propane can also be accomplished. It is also important that the crude 2,2-bis(4-hydroxyphenyl)propane to be purified be substantially free of phenol, since otherwise the phenol adduct of 2,2-bis(4-hydroxyphenyl)propane may interfere with the purification process. When 2,2-bis(4-hydroxyphenyl)propane is obtained from the reaction of phenol with acetone or with 2,2-dimethyl-1,3-dioxolane, a large excess of phenol is employed. Therefore, the excess phenol must be removed by any convenient conventional technique such as a distillation technique.

It is not necessary that the ethylene glycol to be used as solvent be completely free of impurities such as glycols and/or lower alcohols. If use is made of ethylene glycol obtained as a by-product in the preparation of 2,2-bis(4-hydroxyphenyl)propane from 2,2-dimethyl-1,3-dioxolane and phenol, impurities such as glycols and lower alcohols are normally absent. However, small amounts of decomposition products of the starting material, 2,2-dimethyl-1,3-dioxolane, can be tolerated in the purification step.

The amount of ethylene glycol to be used as a solvent is not critical. However, the use of high ethylene glycol to diphenylolpropane ratios requires the use of a larger amount of water, thereby producing a larger quantity of mother liquor which must be treated. Accordingly, it is preferred that the weight ratio of ethylene glycol to diphenylolpropane type compounds be from about 10:90 to about 60:40. A preferred weight ratio of ethylene glycol to diphenylolpropane-type compounds is 1:1. Note that the term "diphenylolpropane-type compounds" refers to both 2,2-bis(4-hydroxyphenyl)propane and the by-product derivatives produced in the reaction of its production.

After the phenol is removed from the crude 2,2-bis(4-hydroxyphenyl)propane mixture and the crude 2,2-bis(4-hydroxyphenyl)propane mixture is dissolved in the ethylene glycol, water is added to the crude 2,2-bis(4-hydroxyphenyl)propane/ethylene glycol mixture. The amount of water to be added is critical and a suitable crystallization occurs only when the amount of water is added within certain limits. With amounts of water exceeding 50% by weight calculated on the total mixture to be treated (diphenylolpropane-type compounds plus ethylene glycol), the precipitation occurs very rapidly wherein the main impurity, 2-(2-hydroxyphenyl)-2-(4-hydroxyphenyl)propane is precipitated with the 2,2-bis(4-hydroxyphenyl)-propane. When the amount of water added is less than 15% by weight, calculated on the total mixture to be treated, the precipitation proceeds very slowly, which is not desirable for a commercial process. Accordingly, it has been found that the best results are obtained if the amount of water employed is from about 15% by weight to about 40% by weight, preferably about 25% by weight to about 35% by weight, calculated on the total mixture (diphenylolpropane-type compounds plus ethylene glycol).

If the water is added to the crude 2,2-bis(4-hydroxyphenyl)propane dissolved in ethylene glycol in only one step, relatively large crystals are formed. If the water is added in incremental steps, smaller crystals are formed. Hence, the size of the crystals can be regulated to some extent by controlling the addition rate of the water.

The preferred temperature at which the purification procedure is carried out is from about 30°C to about 60°C although the procedure may be performed at lower or ambient temperatures or at higher temperatures.

A preferred embodiment of the present invention is performed by contacting a solution of crude 2,2-bis(4-hydroxyphenyl)propane, which is filtered to remove any solid impurities, in ethylene glycol with water at a temperature of 70°C. The crystal slurry obtained by lowering the temperature to about 30°C, such crystals being substantially pure 2,2-bis(4-hydroxyphenyl)propane, is transferred, preferrably at 30°C, to a filter where the crystals are separated. After a washing treatment, the crystals are transfered to a drying means, such as an endless belt dryer, and are then subsequently stored.

In the preferred embodiment wherein the 2,2-bis(4-hydroxyphenyl)-propane is prepared starting from 2,2-dimethyl-1,3-dioxolane and phenol, with the result that the crude 2,2-bis(4-hydroxyphenyl)propane and the ethylene glycol are produced together, it is advantageous to design the purification process as a continuous process. After removal of the hydrogen chloride and a substantial portion of the phenol from the reaction mixture, the addition of water to the remaining liquid results in the precipitation of highly pure 2,2-bis(4-hydroxyphenyl)propane. The ethylene glycol from the mother liquor, after separation from the water, is recycled to the reactor wherein the 2,2-dimethyl-1,3-dioxolane and phenol are reacted to produce 2,2-bis(4-hydroxyphenyl)propane and ethylene glycol. In this manner, only small amounts of make-up ethylene glycol need be added to the continuous process.

The mother liquor obtained after filtration of the precipitated 2,2-bis(4-hydroxyphenyl)propane crystals is relatively rich in the predominant impurity, 2-(2-hydroxyphenyl)-2-(4-hydroxyphenyl)propane, which is the isomer of 2,2-bis(4-hydroxyphenyl) propane. Therefore, in a preferred embodiment, the total yield of 2,2-bis(4-hydroxyphenyl)propane is increased by subjecting the mother liquor to an isomerization treatment. This isomerization treatment preferrably occurs after removal of at least a portion of the solvent present so as to increase the concentration of 2-(2-hydroxyphenyl)-2-(4-hydroxyphenyl)propane. The isomerization treatment can be carried out at any suitable place in the process, and under any convenient isomerization condition. A number of acceptable isomerization processes are known to those knowledgeable in the art.

If even higher purity 2,2-bis(4-hydroxyphenyl)propane is desired than is obtained from a single purification treatment, the purification treatment may be repeated.

The following embodiments illustrate the invention. It is to be understood, however, that the Illustrative Embodiments and Comparative Examples are for the purpose of illustration only, and the invention is not to

ILLUSTRATIVE EMBODIMENT I

To a continuous operating stirred tank reactor were charged 600 grams per hour of a feedstock containing 1 mole of the cyclic ketal 2,2-dimethyl-1,3-dioxolane per 10 moles of phenol, 100 g of ethylene glycol per mole of cyclic ketal and 30 g of gaseous hydrogen chloride per 10 moles of phenol.

The overall residence time of the reaction mixture was 30 minutes with a conversion of 2,2-dimethyl-1,3-dioxolane of 90%. The reactor effluent was continuously fed to a hydrogen chloride-stripping column which resulted in a product containing less than 5 ppm hydrogen chloride.

Unconverted cyclic ketal, excess phenol as well as part of the ethylene glycol were removed in a distillation column, the bottom product from the distillation column containing about 50% w ethylene glycol and about 50% w diphenylolpropane-type compounds [2,2-bis(4-hydroxyphenyl)propane, 2-(2-hydroxyphenyl)-2-(4-hydroxyphenyl)propane and higher derivatives]. The weight ratio of 2,2-bis(4-hydroxyphenyl)propane to 2-(2-hydroxyphenyl)-2-(4-hydroxyphenyl)propane in the bottom product was 89:11. To the phenol-free bottom product thus obtained, water was added in such an amount that the resulting solution contained 30% w water at a temperature of 70°C. By cooling the resultant solution under gentle stirring to ambient temperature, diphenylolpropane crystals precipitated. The crystal mass was filtered off, reslurried in warm water (60°C) and again filtered and dried to constant weight at 80°C under vacuum. 2,2-Bis(4-hydroxyphenyl)propane was obtained in 80% yield calculated on the amount of 2,2-bis(4-hydroxyphenyl)propane formed during the reaction. The product contained 98% 2,2-bis(4-hydroxyphenyl)propane and 2% 2-(2hydroxyphenyl)-2-(4-hydroxyphenyl)-propane, determined with the aid of gas-liquid-chromatography after silylating a sample of the product.

ILLUSTRATIVE EMBODIMENT II

Crude 2,2-bis(4-hydroxyphenyl)propane having a 2,2-bis(4-hydroxyphenyl)propane to 2-(2-hydroxyphenyl)-2-(4-hydroxyphenyl)-propane ratio of 96.5/3.5 was dissolved in ethylene glycol in am amount to obtain 60% w of diphenylolpropane-type compounds, calculated on the resulting solution, at a temperature of 70°C. To 100 parts by weight of this solution 43 parts by weight of water were added — the amount of water in the final solution being 30% w. This solution was cooled to ambient temperature with gentle stirring. The resulting diphenylolpropane-type crystals were filtered off, reslurried in 1.5 times their weight of water at 60°C. The crystals were filtered again and dried at 80°C under vacuum. The product obtained in 95% yield, contained 99.5% 2,2-bis(4-hydroxyphenyl)propane and 0.5% 2-(2-hydroxyphenyl)-2-(4-hydroxyphenyl)propane, determined with the aid of gas-liquid-chromatography.

ILLUSTRATIVE EMBODIMENT III

The crystals of 2,2-bis(4-hydroxyphenyl)propane obtained according to the purification method described in Illustrative Embodiment I were redissolved in ethylene glycol under the conditions described in Illustrative Embodiment II. After the addition of water (43 parts by weight per 100 parts by weight of total solution) and after using the work up procedure described in Illustrative Embodiment II, very pure 2,2-bis(4-hydroxyphenyl)propane, having a ratio of 2,2-bis(4-hydroxyphenyl)propane to 2-(2-hydroxyphenyl)-2-(4-hydroxyphenyl)propane of 99.7:0.3, was obtained.

COMPARATIVE EXAMPLE I

To a solution of diphenylolpropane-type compounds in ethylene glycol, obtained via the route described in Illustrative Embodiment I, water was added at a temperature of 60°C in such an amount that the resulting solution contained 10% w of water, 45% w of ethylene glycol and 45% w of diphenylolpropane-type compounds. No precipitation of 2,2-bis(4-hydroxyphenyl)propane crystals occurred.

COMPARATIVE EXAMPLE II

To a solution of 2,2-bis(4-hydroxyphenyl)propane in ethylene glycol (containing 70% w ethylene glycol) water was added at ambient temperature in such an amount that the resulting solution contained 25% w water. No precipitation of 2,2-bis(4-hydroxypnenyl)propane crystals occurred.

COMPARATIVE EXAMPLE III

Crude 2,2-bis(4-hydroxyphenyl)propane consisting of 97.35% w 2,2-bis(4-hydroxyphenyl)propane and 2.65% w 2-(2-hydroxyphenyl)-2-(4-hydroxyphenyl)propane was dissolved in an equal amount by weight of ethylene glycol at 70°C. To 100 parts by weight of the above-mentioned solution, there was added 100 parts by weight of water. Thereafter, the solution was cooled with gentle stirring resulting in the precipitation of a crystal mass. The crystals obtained were filtered off at room temperature, reslurried in water of 60°C, filtered again and dried at 80°C under vacuum. More than 98% of the diphenylolpropane-type compounds were recovered. The ratio of 2,2-bis(4-hydroxyphenyl)propane to 2-(2-hydroxyphenyl)-2-(4-hydrophenyl)propane in the final crystals was 98:2, indicating that the main impurity had precipitated together with the desired isomer.

We claim as our invention:

1. A process for the purification of a crude 2,2-bis(4-hydroxyphenyl)propane mixture prepared by reacting phenol with acetone or 2,2-dimethyl-1,3-dioxolane in the presence of an acidic catalyst, said crude 2,2-bis(4-hydroxyphenyl)propane mixture being free of phenol, which process comprises:
   a. dissolving the crude 2,2-bis(4-hydroxyphenyl)propane and impurities in ethylene glycol;
   b. contacting the ethylene glycol-crude 2,2-bis(4-hydroxyphenyl)-propane solution with water wherein the weight ratio of water to the ethylene glycol-crude 2,2-bis(4-hydroxyphenyl)propane solution is about 15:100 to about 40:100.
   c. gradually cooling and agitating the ethylene glycol-crude 2,2-bis(4-hydroxyphenyl)propane-water solution so as to form a purified 2,2-bis(4-hydroxyphenyl)propane precipitate; and
   d. recovering the purified 2,2-bis(4-hydroxyphenyl)propane.

2. A process according to claim 1 wherein the weight ratio of ethylene glycol to crude 2,2-bis(4-hydroxyphenyl)propane is about 10:90 to about 60:40.

3. A process according to claim 1 wherein steps 1(a) and 1(b) are conducted at a temperature of about 60°C to about 70°C.

4. A process according to claim 1 wherein the ethylene glycol-crude 2,2-bis(4-hydroxyphenyl)propane-water mixture is gradually cooled to a temperature of about 30°C.

5. A process according to claim 1 wherein the crude 2,2-bis(4-hydroxyphenyl)propane consists of at least 80% by weight 2,2-bis(4-hydroxyphenyl)propane.

6. A process according to claim 1 wherein the water added in step 1(b) is added in incremental amounts.

7. A process according to claim 1 wherein the crude 2,2-bis(4-hydroxyphenyl)propane is obtained from the reaction of 2,2-dimethyl-1,3-dioxolane and phenol and wherein the ethylene glycol to be used as the solvent in step 1(a) is at least partially obtained as a by-product of the reaction of 2,2-dimethyl-1,3-dioxolane and phenol.

8. A process according to claim 1 wherein the impurities found in the crude 2,2-bis(4-hydroxyphenyl)propane mixture include 2-(2-hydroxyphenyl)-2-(4-hydroxyphenyl)propane.

9. A process according to claim 1 wherein the 2-(2-hydroxyphenyl)-2-(4-hydroxyphenyl)propane contained in the mother liquor remaining after the removal of the crystals of 2,2-bis(4-hydroxyphenyl)propane is subjected to an isomerization treatment so as to convert at least some of said 2-(2-hydroxyphenyl)-2-(4-hydroxyphenyl)propane to 2,2-bis(4-hydroxyphenyl)propane.

* * * * *